Oct. 17, 1939.  E. P. WEBSTER  2,176,617
BELT COUPLING
Filed July 20, 1937
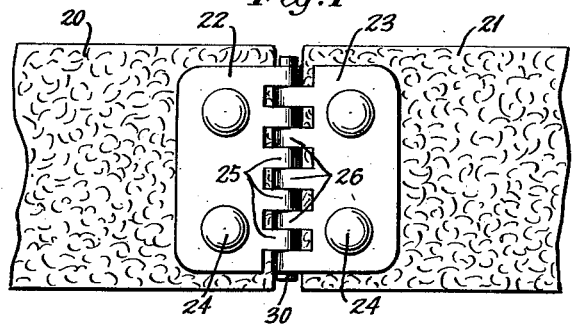
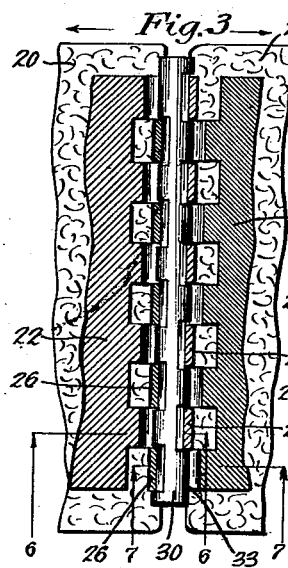
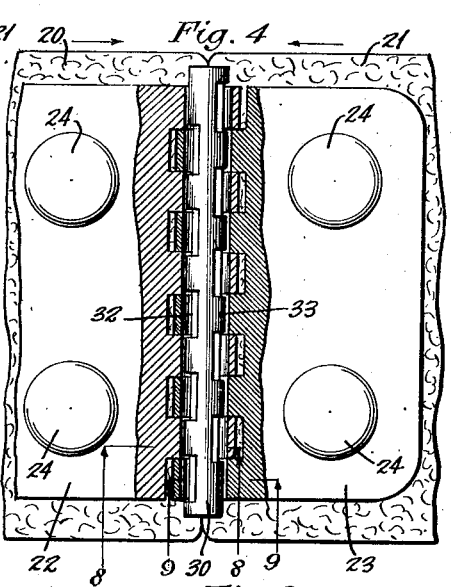
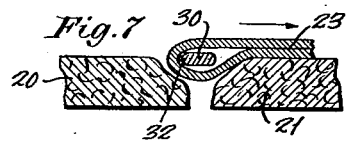
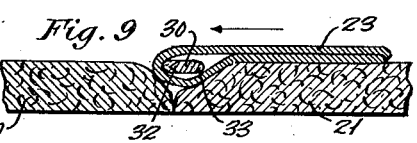
INVENTOR
Edgar P. Webster,
BY
ATTORNEY Patented Oct. 17, 1939

2,176,617

UNITED STATES PATENT OFFICE 2,176,617

BELT COUPLING

Edgar P. Webster, Bridgeport, Conn.

Application July 20, 1937, Serial No. 154,569

2 Claims. (Cl. 24—33)

The invention relates to a hinged fastener and more particularly to one of the type for securing the ends of a flexible power transmitter or belt.

It is well known that serious difficulties have been encountered in the fasteners for flexible belts for machinery due to rapid wear of the hinge pins and associated parts. This rapid wear is due principally to the constant friction due to turning present between the fastening elements when the belt passes around the pulleys or wheels and also due to the whipping action which takes place each time the power transmitter is deflected from the straight or tangent line of travel to the circular line of travel about the pulley. There is also a tendency for the pin to work out from between the hinges as the belt is flexed.

According to the present invention a hinge pin is provided to cooperate with the hinge elements secured to the flexible belt to hold the ends of the same together. The pin is provided with contacting edges which engage and bear against the loops usually provided on the hinge elements. These surfaces on the edges of the pin which, contact and bear against the loops, are provided with antifriction bearing means, or more particularly, with knife-edges which materially reduce the friction in the fastener, due to the turning or rocking action between the hinge pin and hinge elements, and consequent wear on the parts.

Another feature of the invention is the provision of interlocking means between the loops on the hinge members and the hinge pin which make it a self-locking fastener. Provided on the opposite edges of the pin are staggered recesses or bearing seats which engage the sides of the loops when the pin is in operative position. With this construction, when the belt or flexible power transmitter is to be connected, the ends may be moved together so that the loops provide a channel for the insertion of the hinge pin. After the hinge pin are opposite the corresponding bearing the channel so that the bearing surfaces on the hinge pin are opposite the corresponding bearing surfaces on the loops of the hinge elements, the belt is placed under tension and the hinge elements move into cooperative relation with the pin. The side edges of the recesses contact the edges of the loops and effectively hold the pin against any endwise movement while the belt is under tension so that the bearing surfaces are always in proper position to engage the loops. Also because of this feature of the invention, the operator can very quickly assemble or disassemble the fastener without the aid of tools.

In the preferred form of the invention, the edge of the hinge pin opposite the recess is rounded off so that the loop can rock on the knife-edge in the recess more freely and without any interference from the opposite edge of the pin. This arrangement obviously aids in reducing the objectionable friction in the fastener.

Other features and advantages of the invention will be apparent from the following specification taken in connection with the drawing in which:

Figure 1 is a plan view of the belt fastener with the pin in operative position.

Fig. 2 is a side elevation of the fastener as shown in Fig. 1.

Fig. 3 shows a plan view partly in section of the hinge pin in operative relation with the hinge element on the belt.

Fig. 4 is a plan view partly in section, showing the edges of the belt moved together so that the loops are released from the pin to provide a channel for the endwise movement of the pin.

Fig. 5 is a view similar to Fig. 4 showing the hinge pin partly removed.

Fig. 6 is a section taken along lines 6—6 of Fig. 3 showing the left-hand hinge plate in operative relation to the bearing surface of the hinge pin.

Fig. 7 is a section taken along lines 7—7 of Fig. 3 showing a view of the right-hand hinge plate, similar to that shown in Fig. 6.

Fig. 8 is a sectional view taken along line 8—8 of Fig. 4 showing the left-hand hinge plate with the hinge pin in position to be removed therefrom.

Fig. 9 is a section view taken along the line 9—9 of Fig. 4 and shows the right-hand hinge plate with the hinge pin in position to be removed.

In the preferred form of the invention, a pair of belt sections 20 and 21 which are adapted to be fastened together have mounted at their ends a fastening device comprising hinge plates secured together by a hinge pin. A hinge plate or element 22 is mounted on the end of the belt section 20 and a corresponding hinge plate or element 23 is mounted on the end of the belt section 21. These hinge plates or elements are secured to their respective belt sections by rivets 24 passing through the same and into the belt. The hinge plate 22 is provided with a plurality of outwardly-extending loops 25. The hinge plate 23 is provided with a plurality of outwardly-extending loops 26. These loops are arranged so that they extend outwardly beyond the end of the belt, and, as shown in Fig. 2, are formed with a flat top, the loop portion being positioned so as to extend below the upper surface of the belt. The loops 25 rest on a cut-away portion 27 of the belt 20 and the loops 26 rest on a cut-away portion 28 of the end of the belt 21. This arrangement provides an adequate support for the outwardly-extending loop members. The loops on the two hinge elements are arranged so that they may be positioned in interdigitated relation with the apertures in the loops in alignment. This forms a channel for the reception of a hinge pin 30 which secures the two ends of the belt together so that the latter may flex as desired.

The preferred hinge pin of the present invention comprises a flat pin 30 having rounded edges, although pins of other shapes may be used. Spaced along the opposite edges of the pin in staggered relation are a plurality of recesses or bearing seats 31. The staggered relation of the recesses places them in position to engage the loops of the hinge plates when the pin is in operative relation. As shown in Fig. 4, the two belt sections have been moved together in the direction of the arrows and the loops have been aligned to form a channel into which the hinge pin 30 may be readily slipped so that the recesses assume a definite position with respect to the loops as shown in Fig. 4. The cut-away portions 27 and 28 permit the loops to be readily positioned in the aligned relation. The belts are then placed under tension and move in the direction of the arrows in Fig. 3, the loops of the hinge plates moving into contact with the recesses on the hinge pin to bear thereagainst.

In order to avoid excessive friction at the bearing point between the hinge pin and the hinge plates, the present invention provides antifriction bearing surfaces on the hinge pin to cooperate with the loops of the hinge plates to reduce friction between these elements when the belt flexes, by causing the loops to rock with respect to the hinge pin. The preferred form of antifriction surface herein disclosed comprises knife-edges 32 formed on the contacting surfaces of the recesses of the hinge pin. These knife-edges engage the rounded inner surface of the loop with a line contact so that the hinges will rock thereon. This removes the sliding frictional contact found in the usual fasteners which causes them to rapidly wear out and gives a practically frictionless operation. It will be seen that, due to the flat shape of the pin, contact between the pin and hinge members is restricted to the knife-edge bearing surfaces so that a frictionless fastener is obtained.

The interengagement between the recesses or notches on the pin and the loops on the hinge plates will cause the knife-edge bearing surfaces to be in position to engage the loops to provide the desired bearing surface when being assembled. This relation also effectively locks the pin in place and prevents the same from moving endwise to shift the bearing surfaces during operation.

As shown in Fig. 5, the staggered relation of the recesses in the pin positions a rounded edge 33 on the pin opposite a recess on the other edge. The rounded edge will extend across the back of the loop for substantially the width of the loop as shown in Fig. 3. The loop is substantially pear-shaped as shown in Figs. 6 through 9, so that the hinge member can freely rock on the knife-edge. The enlarged back portion of the loop when functioning with the rounded edge greatly reduces the frictional contact between the loops and the hinge pin. This relation can be very clearly seen in the drawing and permits the belt to be used with pulleys of small diameter with sufficient freedom so as not to hold the pin against rocking.

From the above description it will be seen that the belt fastener can be quickly assembled or disassembled without the use of tools. To assemble the fastener, the two ends of the belt are moved together until the hinge loops are in alignment and the hinge pin put in place. The ends are released and the normal tension in the belt will cause the pin to be locked therein automatically. To disassemble the fastener, the ends of the belt are moved together until the channel is formed by the loop and the hinge pin can be manually slid out.

Variations and modifications may be made within the scope of this invention and portions of the improvements may be used without others.

I claim:

1. In a fastener for the ends of a belt comprising a pair of hinge members each secured to one end of the belt and having a plurality of loops projecting outwardly beyond the belt and placed in alignment; a flat pin with rounded edges extending through the aligned loops, said pin having recessed bearing seats along its rounded edges which bear against the loops, and a knife edge formed on the bearing surface of each seat.

2. A belt fastener pin of the type used in connecting the alternate loops of a hinge type belt fastener, comprising a pin having recessed bearing seats on its opposite edges and hinge-engaging knife edges formed on the bearing surface of the seats.

EDGAR P. WEBSTER.

CERTIFICATE OF CORRECTION.

Patent No. 2,176,617.　　　　　　　　　　　　October 17, 1939.

EDGAR P. WEBSTER.

It is hereby certified that error appears in the printed specification of the above numbered patent requiring correction as follows: Page 1, first column, line 42, strike out the words "are opposite the corresponding bearing" and insert instead has been inserted and positioned in; and that the said Letters Patent should be read with this correction therein that the same may conform to the record of the case in the Patent Office.

Signed and sealed this 5th day of November, A. D. 1939.

(Seal)

Henry Van Arsdale,
Acting Commissioner of Patents.